Patented Mar. 31, 1931

1,798,253

UNITED STATES PATENT OFFICE

WILLIS A. GIBBONS, OF LITTLE NECK, NEW YORK, ASSIGNOR TO AMERICAN RUBBER COMPANY, OF EAST CAMBRIDGE, MASSACHUSETTS, A CORPORATION OF MASSACHUSETTS

COMPOUNDING PROCESS AND PRODUCTS

No Drawing.    Application filed June 7, 1924.  Serial No. 718,561.

This invention relates to a compounding process and products, and more particularly as applied to the mixing of compounds such as organic acids and other substances containing acid radicals with materials with which they are not directly or conveniently miscible.

There is a wide spread use of organic acids in the arts and in many of their applications the acids must be mixed with various other substances, for instance, in the rubber art with fillers and with rubber in different forms. Among these acids some of the higher aliphatic acids, such as stearic, are used for certain purposes in compounding with rubber to impart desired qualities, stearic acid, for example, being known to increase the abrasion value and hardness of the rubber. One common way of mixing the stearic or other acids and acidic substances with rubber is to compound on a mill in the usual manner, but it is not practicable directly to add some of them to a water dispersion of rubber such as latex. Owing to the fact that many of the higher organic acids and other substances containing acid radicals are insoluble or non-miscible with water, or owing to their acidic character, they cannot be mixed directly with latex. In many other instances where it is desired to mix organic acids with other substances, particularly where a small quantity of the acid is to be very completely dispersed in such substances, the direct mixing is impracticable.

An object of the present invention is to provide an improved process for compounding water insoluble higher organic acids and acid materials with other substances.

Another object is to provide an improved process for compounding such acids with colloidal suspensions having water in the continuous phase.

Another object is to provide an improved process for mixing organic acids and acidic substances in water soluble form with rubber latex.

A further object is to provide improved latex and dried latex compounds.

For a detailed disclosure of the invention reference is had to the accompanying specification and claims.

The invention consists broadly in converting the organic material into a compound which is miscible without milling with the desired substance in finely divided or fluent form, mixing the compound and substance, decomposing the compound, and removing a portion thereof to leave the free organic material uniformly mixed in the desired substance. The invention also includes the products of the process.

As one example of the invention, it is sometimes desirable to mix higher aliphatic acids such as stearic, palmitic, oleic, etc., with rubber in the form of a water dispersion such as latex. In the first step the acid is preferably converted into a salt of a suitable base, the latter being one which may be readily split off from the acid and removed after mixing with the rubber, and for example the ammonium salt or soap of stearic acid or the salt of one of the substituted ammonias may be used. The specific manner of forming the salt forms no part of the present invention, and in carrying out this step using stearic acid any of the known methods may be employed, such as dissolving the acid in ammonium hydroxide, dry mixing of ammonium carbonate and the acid, or by passage of ammonia gas into the melted acid.

If it is desired to compound the stearic acid with a water dispersion of rubber such as latex the ammonium stearate may then be directly added to the latex as a paste and mixed therewith or it can be diluted with water to any desired consistency and stirred into the latex. If it be desired to add an organic acid to an artificial water dispersion of vulcanized or unvulcanized rubber prepared by the known methods the acid can be converted into a salt and added as before described in the case of latex. In either case there results a water dispersion of rubber mixed with ammonium stearate, in the particular example given. This mixture may then be used in any of the ways known in the art to manufacture the desired article, and upon drying to remove the water the ammonia is split off by hydrolysis and removed, leaving a uniform mixture of the stearic acid and rubber.

In the mixing of some fillers, such as carbon black, with rubber on the mill there is an objectionable dusting and flying, and in another example of the invention it may be applied to prevent such action, or to provide a non-flying powdered material wherever desired in the arts. To accomplish this purpose ammonium stearate, for example, may be formed in any preferred manner and is then mixed in desired quantity with water and the carbon black in any suitable form of mill or mixer. This is preferably done by placing a small amount of the carbon black and all of the ammonium stearate in the mill or mixer with sufficient water to make a thin paste. This is mixed until a smooth paste is obtained and the rest of the carbon black and balance of the water are then gradually added together. The batch may then be dried in any suitable manner, such as by partially drying it in the mixing machine and then completing the drying in any desired form of drying apparatus such as a Gordon drier. In the drying operation the ammonia is split off, leaving the stearic acid uniformly incorporated in the carbon black. The resulting product is one which does not fly or dust and which can be readily mixed with rubber on the mill, or if desired the wet mixture of carbon black and ammonium stearate can be mixed with rubber on the mill or added to rubber latex or other water dispersion of rubber, and the ammonia removed as before.

In a similar manner ammonium stearate or the decomposable compound of any other desired acid material can be mixed with many other substances such as talc and other powdered material, glue, casein, etc., either with or without the addition of rubber in the form of latex or other dispersion. In all of the examples given it will be seen that as a result of hydrolysis or heat the ammonium stearate or other compound, after mixing with the desired substance, can be decomposed at a predetermined later point in the particular process in use and the ammonia or other base removed, thereby leaving the free material uniformly distributed in the desired substance. By mixing the volatile base compound of the desired material with rubber on a mill and suitably controlling the heat the base can be set free at a predetermined point in the process to form a spongy rubber compound.

While in the specific examples given the ammonium salt of stearic acid has been specified, it is obvious that the method is applicable to the mixing of other organic acids and acid materials and it is not limited to the use of the ammonium compounds of such, as substituted ammonias or any other base which can be readily split off and removed at the proper time may be used. When the combined acid material has been mixed with a water dispersion of rubber, the mixture may be used as such for the manufacture of spread goods or dipped articles, or the dispersion may be dried by the spray drying process or in any other suitable manner to form rubber for any desired use.

While certain specific embodiments of the invention have been described it is obvious that it is capable of numerous modifications, and it is not desired to limit it otherwise than as set forth in the appended claims.

Having thus described my invention what I claim and desire to protect by Letters Patent is:—

1. A process for compounding soap forming materials with other substances, which comprises converting the material into a water soluble soap, mixing it with a water suspension of rubber, and removing the basic portion from said soap.

2. A process for compounding soap forming materials with other substances, which comprises forming a soap of the material with a volatile base, mixing it with a water suspension of rubber, and removing the volatile base.

3. A process of compounding soap forming materials with other substances, which comprises forming an ammonium soap of a higher aliphatic acid, mixing it with a water suspension of rubber, and removing the ammonia.

4. A process of compounding soap forming materials with other substances, which comprises forming a water soluble soap of the material, mixing it with rubber latex, and reconverting the soap into the original material.

5. A process of compounding soap forming materials with other substances, which comprises forming a soap of the material with a volatile base, mixing it with rubber latex, and removing the volatile base.

6. A process of compounding soap forming materials with other substances, which comprises forming an ammonium soap of the material, mixing it with rubber latex, and removing the ammonia.

7. A process of compounding soap forming materials with other substances, which comprises forming a soap of a higher aliphatic acid and a volatile base, mixing it with rubber latex, and removing the volatile base.

8. A process of compounding soap forming materials with other substances, which comprises forming an ammonium soap of stearic acid, mixing it with rubber latex, and removing the ammonia.

9. A process of compounding soap forming materials with other substances, which comprises mixing a filler with the ammonium-base soap of a higher aliphatic acid and then mixing with latex.

10. A process of compounding soap-forming materials with other substances, which comprises first mixing a water soluble volatile base soap of a higher aliphatic acid with a filler in finely divided fluid form and which does not react with said acid, and subsequently mixing with rubber.

11. A process of compounding soap-forming materials with other substances, which comprises first mixing a water soluble volatile base soap of a higher aliphatic acid with carbon black in finely divided form, and subsequently mixing with rubber.

12. A process of compounding soap-forming materials with other substances, which comprises first mixing a water soluble volatile base soap of a higher aliphatic acid with a filler in finely divided fluid form and which does not react with said acid, and subsequently mixing with an aqueous dispersion of rubber.

13. A process of compounding soap-forming materials with other substances, which comprises first mixing a water soluble volatile base soap of a higher aliphatic acid with carbon black in finely divided form, and subsequently mixing with an aqueous dispersion of rubber.

Signed at New York, county of New York, State of New York, this 4th day of June 1924.

WILLIS A. GIBBONS.